(12) United States Patent
Pradhan et al.

(10) Patent No.: US 7,562,308 B2
(45) Date of Patent: Jul. 14, 2009

(54) PROVIDING USER INPUT VALUES IN INPUT CONTROLS

(75) Inventors: Aurobinda Pradhan, Bangalore (IN); Jackson Mathai, Wielsoch (DE); Srivatsan Santhanam, Bangalore (IN); Prabha Parthasarathy, Bangalore (IN)

(73) Assignee: SAP Aktiengesellschaft, Walldorf (DE)

( * ) Notice: Subject to any disclaimer, the term of this patent is extended or adjusted under 35 U.S.C. 154(b) by 425 days.

(21) Appl. No.: 11/112,618

(22) Filed: Apr. 22, 2005

(65) Prior Publication Data

US 2006/0242600 A1      Oct. 26, 2006

(51) Int. Cl.
G06F 3/00    (2006.01)

(52) U.S. Cl. .............. 715/810; 715/721; 715/723; 715/762; 715/763; 715/780; 715/812; 715/825; 715/828; 715/831; 715/843

(58) Field of Classification Search ........... 715/723, 715/762, 763, 780, 810, 812, 825
See application file for complete search history.

(56) References Cited

U.S. PATENT DOCUMENTS

| | | | | |
|---|---|---|---|---|
| 5,604,854 | A * | 2/1997 | Glassey ............... | 715/209 |
| 6,317,750 | B1 * | 11/2001 | Tortolani et al. ........ | 707/103 R |
| 6,401,079 | B1 * | 6/2002 | Kahn et al. ............ | 705/30 |
| 6,626,959 | B1 * | 9/2003 | Moise et al. .......... | 715/210 |
| 7,143,339 | B2 * | 11/2006 | Weinberg et al. ........ | 715/212 |
| 7,155,665 | B1 * | 12/2006 | Browne et al. ......... | 715/503 |
| 2003/0061246 | A1 * | 3/2003 | Bowman et al. ........ | 707/204 |
| 2004/0107127 | A1 * | 6/2004 | Kanzinger et al. ...... | 705/9 |
| 2004/0193634 | A1 * | 9/2004 | Goodlett et al. ........ | 707/102 |
| 2005/0065856 | A1 * | 3/2005 | Roberts et al. ......... | 705/26 |
| 2005/0273422 | A1 * | 12/2005 | Villacorta et al. ...... | 705/38 |
| 2006/0129929 | A1 * | 6/2006 | Weber et al. .......... | 715/538 |

OTHER PUBLICATIONS

IMP Screenshots (Horde; IMP 3.0), http://web.archive.org/web/20030402001847/www.horde.org/imp/screenshots/.*
Walkenbach, J., Microsoft Office Excel 2003 Bible, Wiley Publication, Inc. (2003), pp. 200-201.*
Undated screen printout from CRM 4.0 system sold by SAP AG.*
Walkenbach, J., *Microsoft Office Excel 2003 Bible,* Wiley Publication, Inc. (2003), pp. 200-201.

* cited by examiner

*Primary Examiner*—Sy D Luu
*Assistant Examiner*—Linh K Pham
(74) *Attorney, Agent, or Firm*—Fish & Richardson P.C.

(57) ABSTRACT

A method of providing user input values for input controls includes receiving, in a graphical user interface wherein input controls are associated with predefined alternative input values, a first input identifying user selection of at least some of the input controls. The method includes receiving a second input identifying user selection of at least one of the predefined alternative input values that is associated with each of the selected input controls. The second input is made using one of the selected input controls. The method includes entering the selected predefined alternative input value in each of the selected input controls. The value may be automatically entered upon receiving the second input. A third input, for example made with a context menu, may be required to enter the value in the selected controls.

17 Claims, 5 Drawing Sheets

PROVIDING USER INPUT VALUES IN INPUT CONTROLS

TECHNICAL FIELD

The description relates to providing user input values in input controls of a graphical user interface.

BACKGROUND

Almost every graphical user interface (GUI) is capable of generating one or more input controls for display to a user. The input controls are typically associated with an application program that is being executed in the computer system. The user can enter one or more values in the input control while working with the application program. The application program can then store the values for future reference or process them, depending on its configuration.

Sometimes the GUI displays several identical input controls. For example, the GUI may display a table in which several instances of a data object are listed. Each of the instances therefore contains identical attributes to which values can be associated, but they do not necessarily contain the same value for the attribute. The GUI contains one input control associated with this specific object attribute for each of the listed instances. Some input controls have predefined alternative input values. Examples include pulldown menus and drop-down list boxes, where the user can use a pointing device to select any listed input value for the control.

The task of selecting and entering the desired input value can be cumbersome. If the user needs to fill in or update several controls in the GUI, the task of going through each one and surveying the available input alternatives to find the appropriate value can be tedious and error-prone. This is particularly inconvenient if each of the input controls has many alternative input values to choose between, because the user then has to scroll through the pulldown menu to the right value for each of the controls.

A version of the customer relationship management (CRM) system available from SAP AG in Walldorf (Baden), Germany, has been provided with a feature by which the user can select individual items in a list and thereafter open a new window to perform operations of assigning values to input controls in the selected items. However, the CRM solution may require the user to select, in the separate window, both the input control (from those available) and the value to be assigned. Moreover, no option for automatically making the value assignment is provided.

SUMMARY

The invention relates to providing user input values in input controls.

In a first general aspect, a method of providing user input values for input controls comprises receiving, in a graphical user interface wherein input controls are associated with predefined alternative input values, a first input identifying user selection of at least some of the input controls. There is received a second input identifying user selection of at least one of the predefined alternative input values that is associated with each of the selected input controls. The second input is made using one of the selected input controls. The selected predefined alternative input value is entered in each of the selected input controls.

In selected embodiments, the available input values are displayed before receiving the second input, the available input values excluding any predefined alternative input value that is not associated with each of the selected input controls. The selected predefined alternative input value may be automatically entered in each of the selected input controls upon receiving the second input. A third input may be required for causing the selected predefined alternative input value to be entered in each of the selected input controls. The third input may be made using a context menu associated with the selected input control with which the user selection of the at least one of the predefined alternative input values is made. The second user input may be received before the first input is received, and the third input may be thereafter received. The input controls may be located in columns of the GUI, and upon the user selecting more than one of the several input controls in a first one of the columns, the at least one predefined alternative input value may be entered in any other of the selected input controls in the first column. Several of the columns may be associated with a user-selectable control for value assignment and upon selection of the control for value assignment for the first column, a value most recently assigned to one of the input controls in the first column is chosen as the selected predefined alternative input value.

In a second general aspect, a GUI for providing user input values for input controls comprises several input controls, any of which a user can select in the GUI. Each of the several input controls is associated with predefined alternative input values. The user can select, using a selected one of the input controls, at least one of the predefined alternative input values for causing the at least one predefined alternative input value to be entered in any selected input control.

In selected embodiments, upon the user selecting the at least one predefined alternative input value in the selected input control, the at least one predefined alternative input value is automatically entered in any other of the several input controls that is also selected. It may be provided that, upon the user selecting the at least one predefined alternative input value in the selected input control, the user can activate a context menu of the selected input control to cause the at least one predefined alternative input value to be entered in any other of the several input controls that is also selected. The several input controls may be located in columns of the GUI, and wherein upon the user selecting more than one of the several input controls in a first one of the columns, the at least one predefined alternative input value may be automatically entered in any other of the selected input controls in the first column. Available input values may be displayed, the available input values excluding any predefined alternative input value that is not associated with any selected input control Advantages of the systems and techniques described herein may include any or all of the following: Providing a GUI that expedites a user's task in entering values in input controls; and providing a GUI wherein the user can group selected input controls for having a common operation performed on them.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 1A-1C show exemplary appearances of a GUI embodiment;

Like reference numerals in the various drawings indicate like elements.

DETAILED DESCRIPTION

Figures 1A, 1B, 1C:
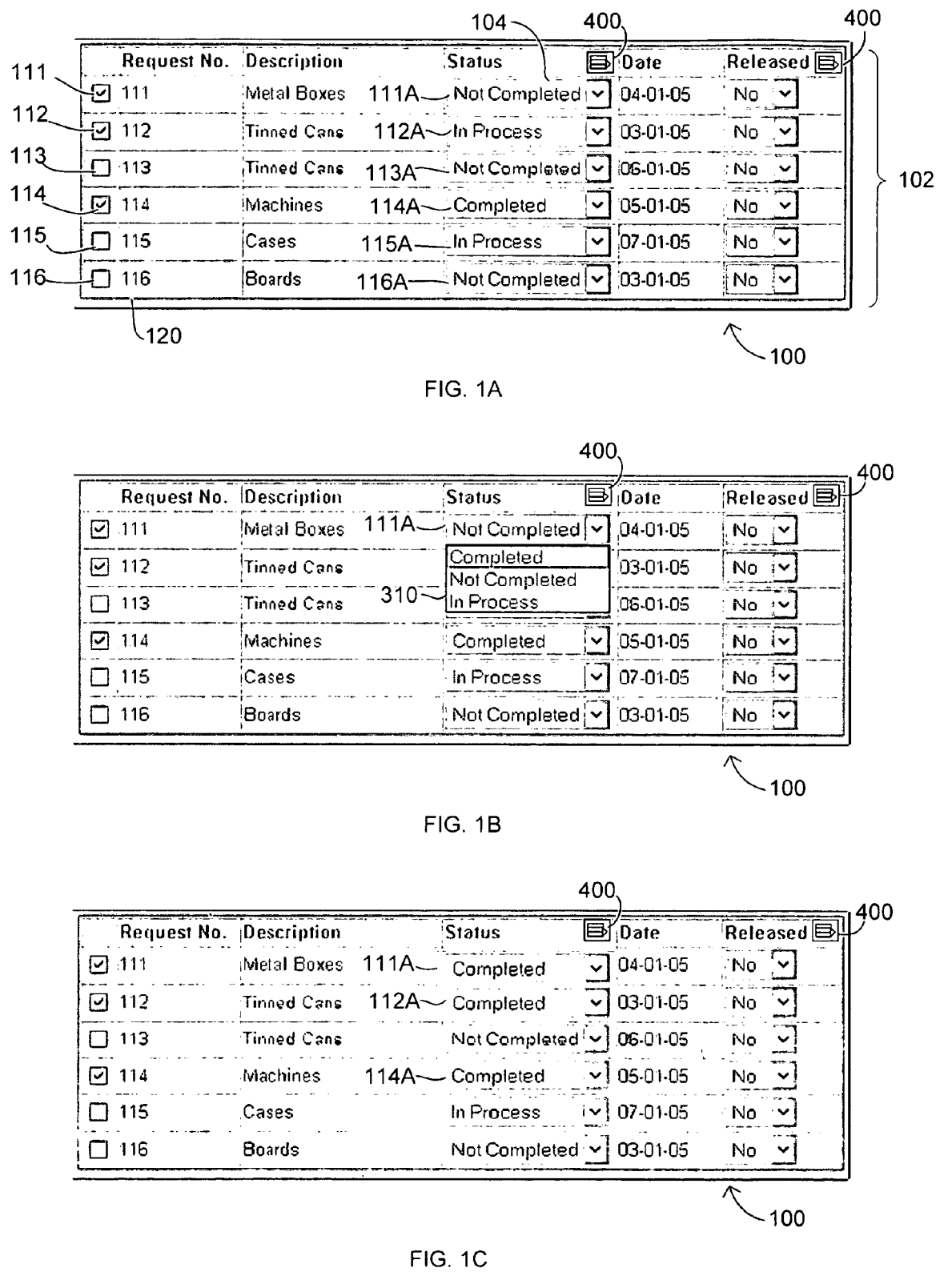
Figure 2:
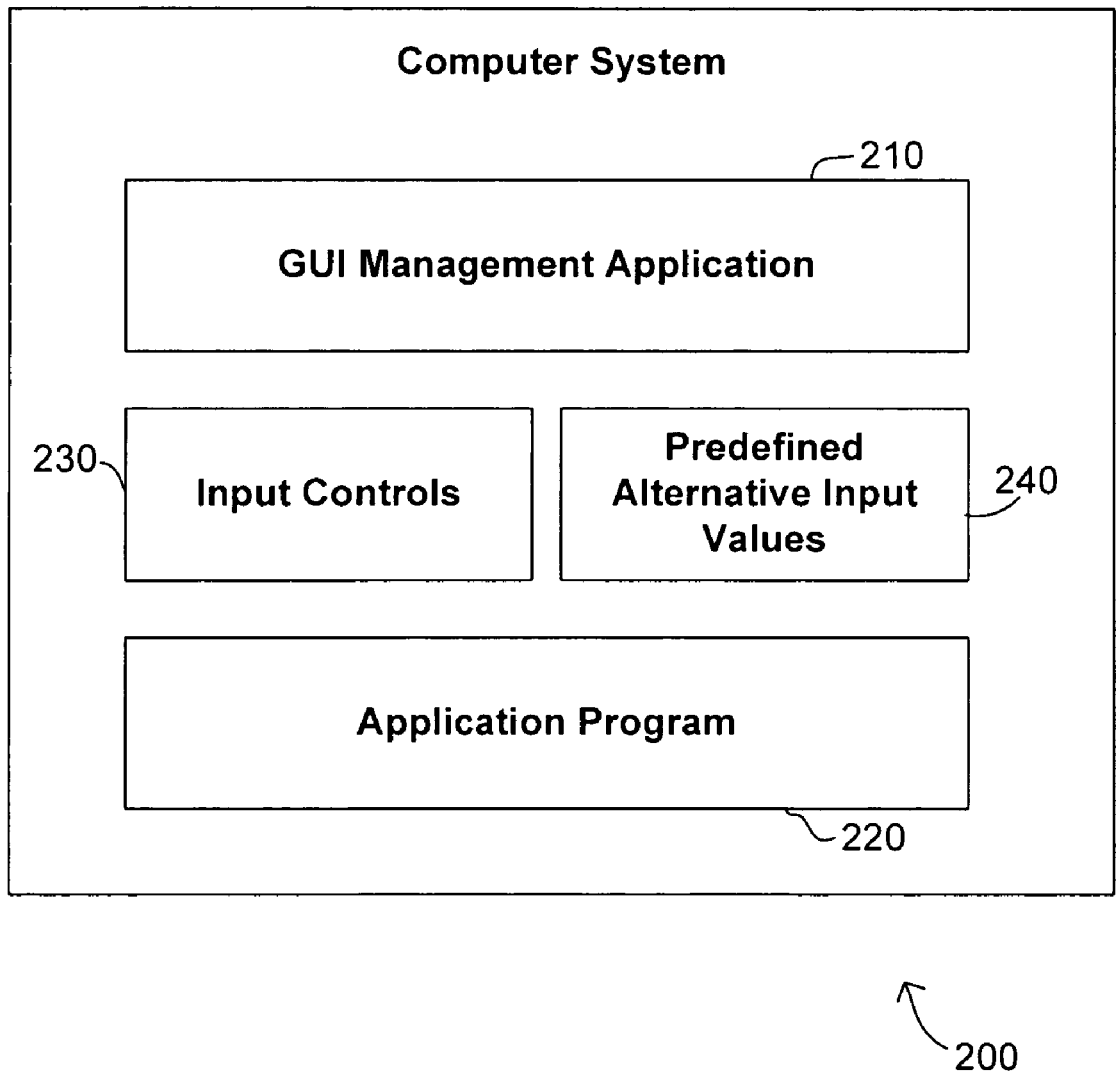
FIG. 2 is a block diagram of a computer system that can generate the GUI embodiment.

FIGS. 1A-1C show various appearances of a GUI 100 that can be generated by a computer system in connection with executing an application program. For example, the application program relates to monitoring requests for material. The computer system represents each material request as an instance of a general request object. The requests are listed in a request area 102. Each request has values assigned to some or all of its individual attributes and these values are displayed in the GUI, for example in a Status column 104.

Here, requests 111-116 are currently listed in the area 102, and they have respective input controls 111A, 112A, . . . , 116A in the Status column 104. The GUI lets the user change the status of any or all of the requests. For example, the request 111 relates to "Metal Boxes" and has the value "Not Completed" listed in the input control 111A. The date of the request is Apr. 1, 2005 and the requested material has not been released to the person making the request. The request 112, in contrast, has the value "In Process" for the corresponding input control. Yet another alternative input value for such a control is "Completed" as seen with the request 114. Thus, a user can consult the GUI to find out what requests have been received, which of them have been completed, and which of the completed requests have been released. Moreover, the user can change the values for the listed attributes by making a suitable input in the corresponding input control.

The user can assign one or more values to the input controls of selected requests using a "mass assignment" operation. The mass assignment operation is here performed automatically upon selection of a value provided that there are controls selected. That is, if the user enters a new input value in a selected input control, the system automatically enters the new value in the corresponding input control for any other selected input control(s). Particularly, the GUI 100 includes a checkbox column 120 in which the user can select any or all of the request instances listed in the area 102. Here, the user selects requests 111, 112 and 114, and these requests are highlighted different from the other instances in the area 102. The user makes the selection to group the selected input controls so that the mass assignment operation can be collectively performed on them.

Thereafter, the user clicks, as shown in FIG. 1B, the input control 111A to display its pull down menu 310 that lists the available inputs. The user selects the value Completed in the menu 310 using a pointing device. This triggers the system to enter this value in each of the selected input controls, as shown in FIG. 1C. Each of the input controls 111A, 112A and 114A now contains the value Completed (the control 114A already had this value). That is, to make a change in the input controls of several request instances, the user should first check the applicable instances and thereafter make the change in any of them. In contrast, if the intended change applies to only a single request instance, the user should make sure that this instance is not selected in the GUI. Thereafter, the user can perform another mass assignment with different values, optionally involving another group of request instances. As another example, the user can make individual changes in any of the input controls.

FIG. 2 shows a block diagram of a computer system 200 that can, for example, produce the GUI 100 for display to a user. The system includes a GUI management application 210 that generates any or all appearances of the GUI and that interacts with at least one application program 220. That is, the inputs and outputs that the application 210 manages through the GUI are involved in the system's execution of the program 220. The system includes several input controls 230 that can be displayed in the GUI. For example, some or all of the input controls 230 can be displayed in the request area 102. The system also includes predefined alternative input values 240 that are associated with specific ones of the input controls 230. For example, some of the values 240 are associated with the input controls 111A-116A and can be displayed in a pulldown menu. When the user selects certain of the input controls 230 in the GUI to have an operation performed communally on them, the system may identify those of the values 240 that are common to all the selected input controls. When the user is done entering values in the GUI, regardless whether they were entered using mass assignment, the GUI management application causes the input values to be stored or otherwise processed in the computer system according to the operation of the application program.

Figure 3A:
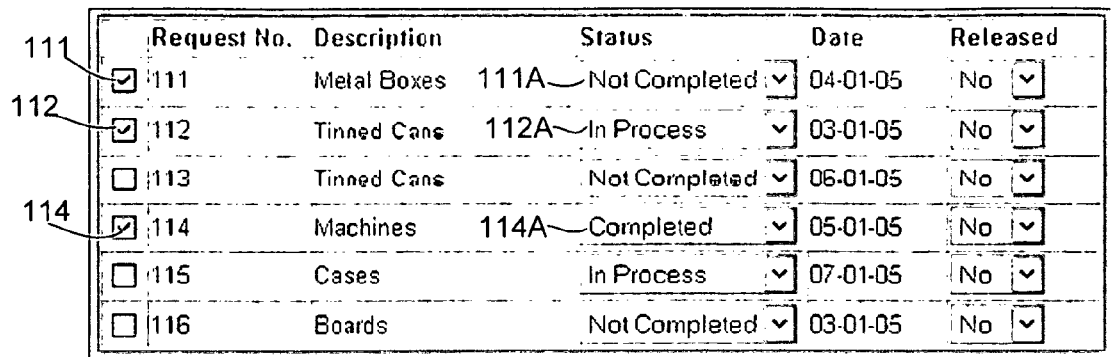
FIGS. 3A-C show other exemplary appearances of the GUI embodiment.
Figure 3B:
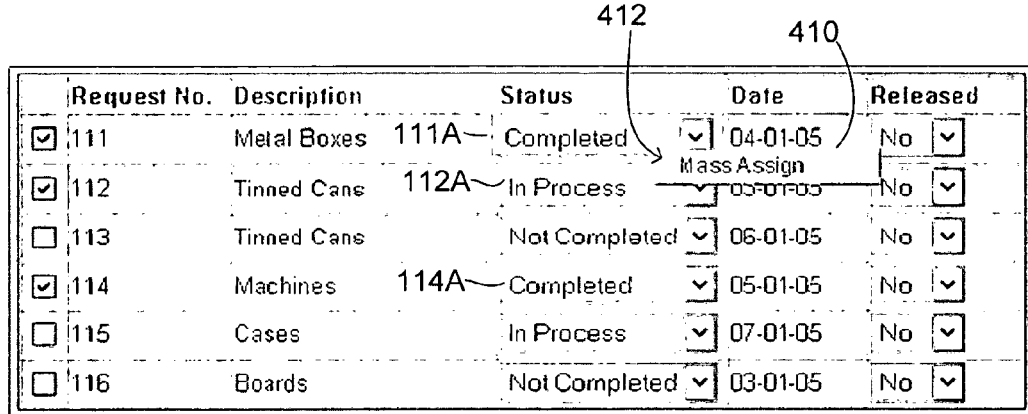
Figure 3C:
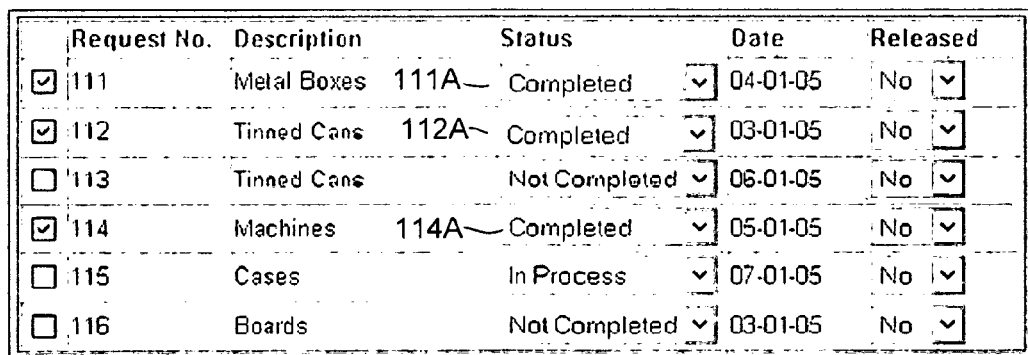

FIGS. 3A-3C show other appearances of the GUI 100 that the GUI management application 210 can produce. In these examples, the application 210 does not automatically apply a value change to other selected input controls, as described with reference to FIGS. 1A-1C. Rather, a user that enters a new input value in a selected input control can choose whether to apply it globally to any other selected input control(s). In FIG. 3A, the input control 111A has the value Not Completed, the input control 112A has the value In Process, and the input control 114A has the value Completed, respectively. The user now changes the value in the input control 111A to Completed using the pointing device. FIG. 3B shows how the input control 111A has been updated with the new value. The values of the other selected (and unselected) input controls have not changed. If the user does not wish to assign the new input value to any other request at this time, the user need not do anything further.

In contrast, if the value is to be entered in all of the selected input controls, the user opens a context menu 410 for the input control 111A, for example by clicking a right mouse button. The context menu may include several user-selectable commands. Particularly, it includes a Mass Assign command 412 that causes the value of the current input control to be entered in each of the selected input controls. The user may initiate the Mass Assign command 412 using the pointing device, and this causes the system to generate the appearance of the GUI 100 shown in FIG. 3C. Each of the input controls 111A, 112A and 114A now contains the value Completed (the control 114A already had this value). Each of the input controls may have a corresponding context menu 410 for initiating the Mass Assign command regarding the value that is currently entered in such input control. The user can initiate the context menu command also when there has not been an immediately preceding change in an input control.

Another example will now be described with reference again to FIGS. 1A-1C. In this example, the application 210 does not automatically apply a value change to other selected input controls, and the context menu 310 (see FIG. 3B) is not used for the mass assignment. Rather, some or all of the columns in the GUI 100 have a user-selectable control 400 for mass assigning values to selected input controls in the respective column. In any particular order, the user selects the requests 111, 112 and 114 in the column 120 and selects the value "Completed" for the input control 111A as shown in FIG. 1B. The user wants to mass assign this value to the selected controls. The user therefore activates (clicks on) the control 400 located in the Status column. The application 210 detects the column of the GUI 100 for which the mass assignment command is received. The application determines which input value was most recently entered in any of the controls in that column. Here, that is the "Completed" value entered in the control 111A. The application 210 therefore causes that value to be entered in each of the selected controls in the Status column. Assume, in contrast, that the user had instead clicked on the control 400 located in the Released column of GUI 100. The application 210 would then instead have identified the value that was most recently changed/ entered in that column, and assigned it to all the selected input controls in that column. The user can first select the input controls and thereafter enter the desired value followed by the mass assignment command, or first enter the desired value and thereafter select the input controls followed by the mass assignment command.

Figure 4:
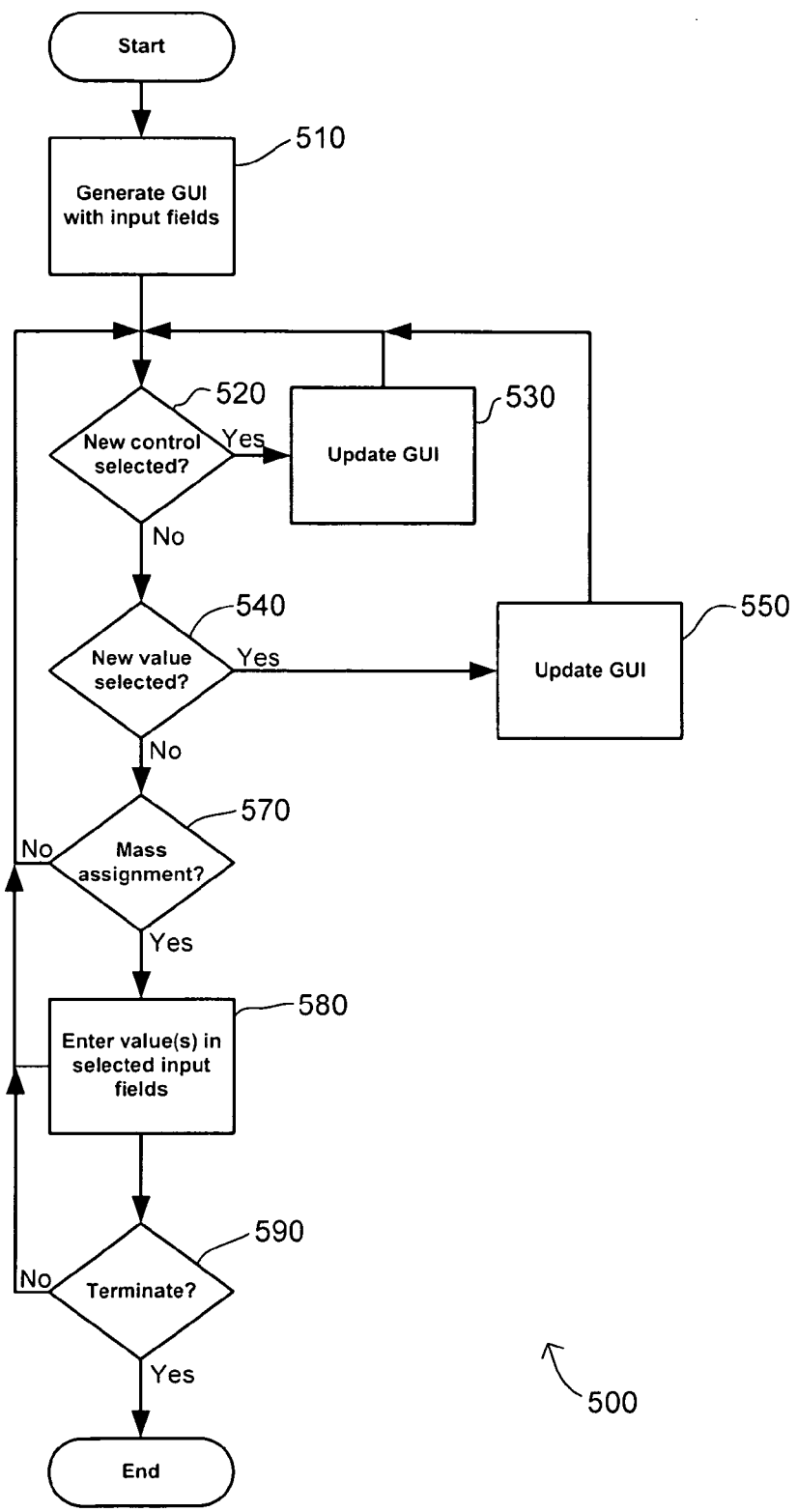
FIG. 4 shows a flow chart of a method embodiment.

FIG. 4 shows a flow chart of an embodiment of a method 500 of providing user input values in input controls. The method can be performed using a computer program product, that is, by a processor executing instructions stored in a computer readable medium. For example, the GUI management application 210 can perform some or all steps of method 500. The method 500 includes the following steps:

Generating, in step 510, a GUI with input controls. The input controls are associated with predefined alternative input values. For example, the GUI management application 210 can generate the GUI 100 having the input controls 111A-116A.

In step 520, the method determines whether the user has selected any or all of the input controls. For example, this determination results in a yes if the user has selected one or more of the requests 111, 112 and 114. The selection of a new control causes the method to update the GUI in step 530. The update may involve displaying a checkmark in the column 120 for the corresponding input control (see FIG. 1A). The update may involve highlighting the row of the selected input control.

When no newly selected input control is detected in step 520, the method continues with step 540, in which it is determined whether the user has selected a new input value that is associated with the selected input control(s). The selection of a new input value causes the method to update the GUI in step 550. The update may comprise ceasing to display the pull down menu 310; the selected value thereafter being displayed in the input control.

When no newly selected value is identified in step 540, the method continues with step 570, in which it is determined whether a mass assignment should be performed. For example, the decision to mass assign in step 570 is made automatically upon the user entering an input value in a selected input control (see FIGS. 1A-1C), or on the user having clicked on the Mass Assign command in the context menu 410 (see FIGS. 3A-3C), or upon the user clicking the control 400. If the answer in step 570 is yes, the mass assignment is carried out in step 580. The mass assignment involves entering the selected predefined alternative input value in the selected input controls. Values may be entered in more than one category of input control. Step 590 provides that any or all of the steps 520-580 can be executed once or more until the computer system terminates execution of the method 500. In other implementations, the order of performing step 520 (detecting newly selected control) and step 540 (detecting newly selected control) may be reversed.

Figure 5:
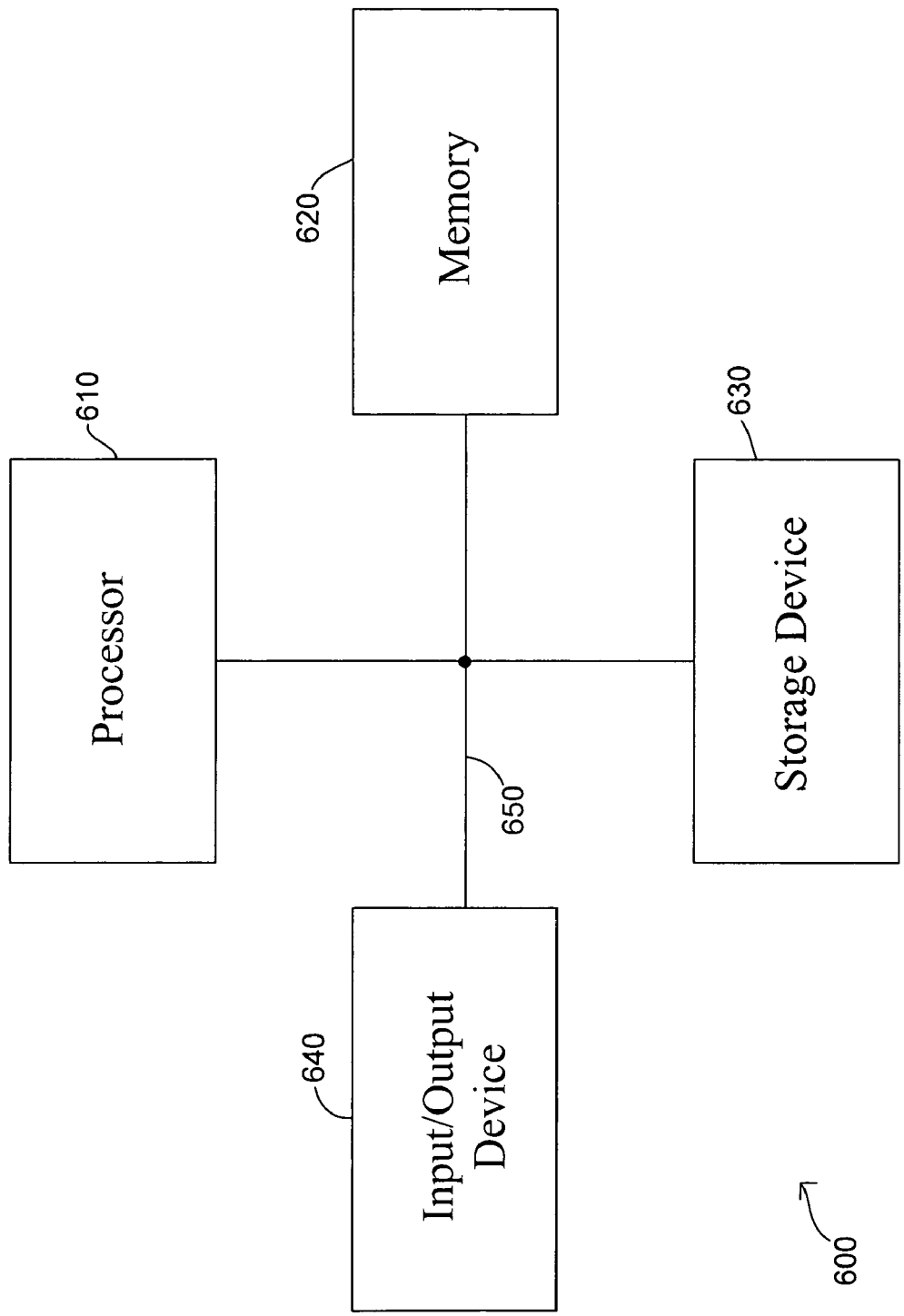
FIG. 5 is a block diagram of a general computer system.

FIG. 5 is a block diagram of a computer system 600 that can be used in the operations described above, for example in the system 200. The system 600 includes a processor 610, a memory 620, a storage device 630 and an input/output device 640. Each of the components 610, 620, 630 and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces. For example, the input/output device can generate any or all GUIs described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, the GUI may have separate checkboxes for the different input controls in an object instance. Accordingly, other embodiments are within the scope of the following claims.

What is claimed is:

1. A method of providing mass data assignment of user input values in input controls, the method comprising:
   receiving, in a graphical user interface wherein each of multiple input controls is associated with a common set of predefined alternative input values, a first input identifying user selection of at least a first plurality of the input controls, to group the first plurality of input controls for mass data assignment in the graphical user interface;
   receiving a second input identifying user selection of at least one of the predefined alternative input values that is associated with each of the selected input controls, the second input being made using one of the selected input controls in the first plurality of input controls and not using any of remaining input controls in the first plurality of input controls;
   in response to receiving the first and second user inputs, performing the mass data assignment in the first plurality of input controls and not in any of remaining input controls of the multiple input controls, including automatically entering the selected predefined alternative input value in each of the selected input controls in the first plurality of input controls, wherein the entered selected predefined alternative input value replaces any value already entered in the corresponding input control; and
   displaying at least the first plurality of input controls in the graphical user interface after performing the mass data assignment, the first plurality of input controls having the selected predefined alternative input values visible in the graphical user interface.

2. The method of claim 1, further comprising displaying available input values before receiving the second input, wherein the available input values automatically exclude any predefined alternative input value that is not associated with each of the selected input controls.

3. The method of claim 1, wherein a third input is required for causing the selected predefined alternative input value to be automatically entered in each of the selected input controls.

4. The method of claim 3, wherein the third input is a mass assignment command made using a context menu associated with the selected input control with which the user selection of the at least one of the predefined alternative input values is made.

5. The method of claim 3, wherein the first, second and third inputs are received as follows:
   initially, the second user input identifying at least one of the predefined alternative input values is received;
   the first input identifying at least a first plurality of the input controls is received after the second input is received, and
   the third input causing the selected predefined alternative input value to be automatically entered is received after the first input is received.

6. The method of claim 1, wherein the input controls are located in columns of the GUI.

7. The method of claim 6, wherein several of the columns are associated with a user-selectable control for value assignment and wherein upon selection of the control for value assignment for the first column, a value most recently assigned to one of the input controls in the first column is chosen as the selected predefined alternative input value.

8. A computer program product tangibly embodied in a computer-readable medium, the computer program product including instructions that, when executed, cause a processor to perform operations comprising:
   receiving, in a graphical user interface wherein each of multiple input controls is associated with a common set of predefined alternative input values, a first input identifying user selection of at least a first plurality of the input controls, to group the first plurality of input controls for mass data assignment in the graphical user interface;
   receiving a second input identifying user selection of at least one of the predefined alternative input values that is associated with each of the selected input controls, the second input being made using one of the selected input controls in the first plurality of input controls and not using any of remaining input controls in the first plurality of input controls;
   in response to receiving the first and second user inputs, performing the mass data assignment in the first plurality of input controls and not in any of remaining input controls of the multiple input controls, including automatically entering the selected predefined alternative input value in each of the selected input controls in the first plurality of input controls, wherein the entered selected predefined alternative input value replaces any value already entered in the corresponding input control; and
   displaying at least the first plurality of input controls in the graphical user interface after performing the mass data assignment, the first plurality of input controls having the selected predefined alternative input values visible in the graphical user interface.

9. The computer program product of claim 8, wherein a third input is required for causing the selected predefined alternative input value to be automatically entered in each of the selected input controls.

10. The computer program product of claim 8, wherein the third input is made using a context menu associated with the selected input control with which the user selection of the at least one of the predefined alternative input values is made.

11. The computer program product of claim 8, wherein the input controls are located in columns of the GUI.

12. The computer program product of claim 11, wherein several of the columns are associated with a user-selectable control for value assignment and wherein upon selection of the control for value assignment for the first column, a value most recently assigned to one of the input controls in the first column is chosen as the selected predefined alternative input value.

13. The computer program product of claim 8, wherein the operations further comprise displaying available input values before receiving the second input, wherein the available input values automatically exclude any predefined alternative input value that is not associated with each of the selected input controls.

14. A computer program product tangibly embodied in a computer-readable medium, the computer program product comprising instructions that, when executed, generate on a display device a graphical user interface (GUI) for providing user input values for input controls, the GUI comprising:

multiple input controls, any of which a user can select in the GUI, each of the multiple input controls being associated with a common set of predefined alternative input values; and selection controls separate from the multiple input controls and associated with respective ones of the multiple input controls, the selection controls configured for a user to generate a first input identifying user selection of at least a first plurality of the input controls, to group the first plurality of input controls for mass data assignment in the GUI;

wherein the user can select, using a selected one of the input controls in the first plurality of input controls and not using any of remaining input controls in the first plurality of input controls, at least one of the predefined alternative input values for causing the mass data assignment to be performed in the first plurality of input controls and not in any of remaining input controls of the multiple input controls, the mass data assignment including at least one predefined alternative input value being automatically entered in any selected input control, the entered selected predefined alternative input value replacing any value already entered in the corresponding input control; and wherein the GUI displays at least the first plurality of input controls after the mass data assignment is performed, the first plurality of input controls having the selected predefined alternative input values visible in the graphical user interface.

15. The computer program product of claim 14, wherein upon the user selecting the at least one predefined alternative input value in the selected input control, the user can activate a context menu of the selected input control to cause the at least one predefined alternative input value to be automatically entered in any other of the several input controls that is also selected.

16. The computer program product of claim 14, wherein the several input controls are located in columns of the GUI.

17. The computer program product of claim 14, wherein available input values are displayed, wherein the available input values automatically exclude any predefined alternative input value that is not associated with any selected input control.

* * * * *